United States Patent Office 2,758,912
Patented Aug. 14, 1956

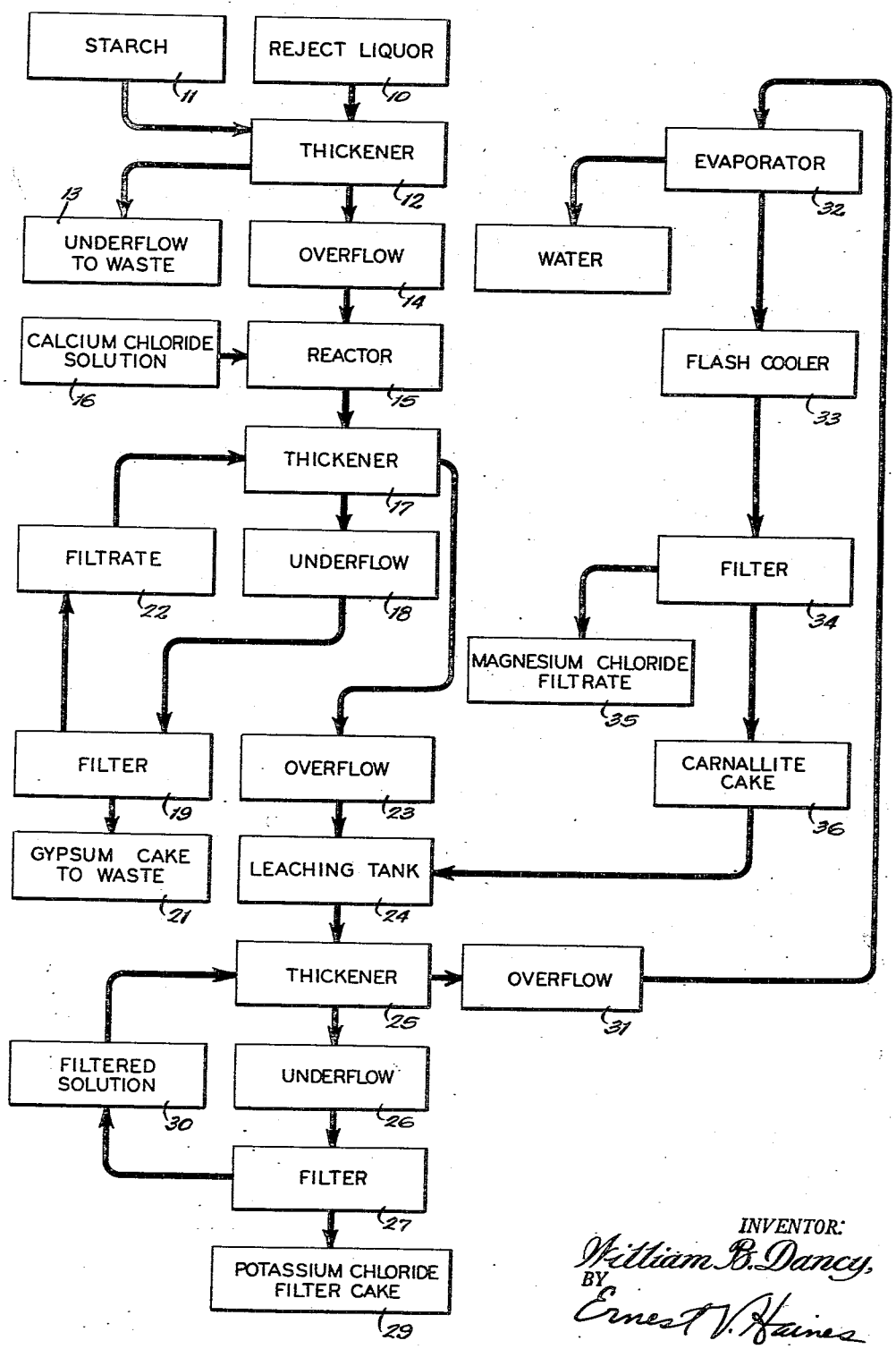

2,758,912

PROCESS FOR PRODUCING A SUBSTANTIALLY SULFATE-FREE AND POTASSIUM-FREE MAGNESIUM CHLORIDE SOLUTION

William B. Dancy, Carlsbad, N. Mex., assignor to International Minerals & Chemical Corporation, a corporation of New York Application December 6, 1951, Serial No. 260,240

6 Claims. (Cl. 23—91)

This invention relates to a process for the treatment of liquors to recover magnesium and potassium values therefrom, and more particularly to a process for the treatment of potassium sulfate reject liquors from base exchange processes or equivalent liquors to recover magnesium and potassium compounds therefrom.

In the process of producing potassium sulfate by base exchange or the metathesis of the sulfate content of langbeinite with the potassium content of potassium chloride, there is produced a mother liquor from which the potassium sulfate crystals have been separated. This mother liquor is usually evaporated and cooled in order to separate potassium chloride and leonite crystals from the liquor. The liquor from which the crystalline salts have been removed is generally sent to waste even though it contains magnesium and potassium compounds. It would be desirable to recover magnesium and potassium compounds from these potassium sulfate reject liquors if a commercially feasible process for their recovery were available.

Heretofore, processes for the recovery of magnesium and potassium values from potassium sulfate reject liquors were characterized by a number of undesirable features. Solid-liquor separations in certain processes were carried out at or near atmospheric boiling temperatures which, in commercial operations, creates serious operating and corrosion problems. In addition, substantial losses of potassium and magnesium values were sustained due to the physical character of the solid impurities to be separated from the liquor because the solids were finely divided and very difficult to separate efficiently. In addition, vacuum filtration cannot be carried out at atmospheric boiling temperatures and separation of the solid impurities had to be effected by means of thickening rather than by filtration.

Another serious disadvantage of certain previous processes is that impurities were removed from the liquor in the form of langbeinite ($K_2SO_4 \cdot 2MgSO_4$). Magnesium is removed in the langbeinite formed and decreases the overall recovery of magnesium from the reject liquors.

It is an object of the instant invention to provide an improved process for the recovery of magnesium and potassium compounds from liquors containing chlorides and sulfates of magnesium, potassium, and sodium.

It is a further object of the instant invention to provide a process for the recovery of magnesium and potassium compounds from potassium sulfate reject liquors or their equivalents which overcomes certain disadvantages of known processes.

It is a further object of the instant invention to provide a commercially feasible process for the recovery from potassium sulfate reject liquors of potassium chloride and magnesium chloride which may be processed to obtain other magnesium chemicals.

It is a further object of the instant invention to provide a process for the production of magnesium chloride, magnesium oxide and hydrochloric acid from potassium sulfate reject liquors or their equivalents.

These and other objects of the instant invention will become apparent from a full understanding of the instant novel process as herein described.

The instant invention involves the treatment of liquors containing chlorides and sulfates of magnesium, potassium and sodium, under conditions herein described to separate potassium, sodium, and sulfate from the liquors and to recover a purified mixture containing magnesium chloride.

According to the general method employed in the instant novel process for the removal of impurities from mixtures or reject liquors which typically contain principally magnesium chloride, water, potassium chloride, sodium chloride and magnesium sulfate, the mixture is treated with a calcium chloride solution under conditions controlled to effect the removal of sulfate as gypsum in a readily filterable condition. The liquor remaining after the separation of the gypsum is treated with carnallite ($KCl \cdot MgCl_2 \cdot 6H_2O$) which results in an increase in the magnesium chloride concentration in the liquor which causes sodium chloride and potassium chloride to crystallize from the liquor. Potassium chloride and sodium chloride which crystallize from the liquor are separated from the liquor, for example, by filtration or by thickening in a conventional type thickener which effects the separation of liquid substantially free of solids from an underflow containing solids and liquid. The resulting liquor is then concentrated to a point near saturation with respect to bischofite. Additional sodium chloride and potassium chloride, combined with magnesium chloride as carnallite, are crystallized from the liquor. The carnallite mixture is separated from the resulting liquor and is recycled to the step in which the liquor from which the gypsum has been separated is treated with carnallite. The resulting purified magnesium chloride liquor may be processed to produce magnesium chemicals.

The liquors which are employed as feed materials in the instant process contain chlorides and sulfates of magnesium, potassium, and sodium. In one embodiment of the instant invention, potassium sulfate reject liquors, such as those produced in a process such as is described and claimed in U. S. Patent 2,295,257, issued to Butt et al., or U. S. application, Serial No. 166,715, filed June 7, 1950, now Patent Number 2,684,285, and the like, are used. The reject liquors which may be treated in accordance with the instant process contain less than about 6.5% magnesium and less than about 3.2% potassium. If the feed liquors are more concentrated with magnesium and potassium values, they should be diluted to the above range prior to carrying out the instant process. A typical example of a potassium sulfate reject liquor suitable as feed material in the practice of the instant invention contains between about 2.9% and about 3.2% potassium, between about 5.5% and about 6.5% magnesium, as well as varying amounts of sodium and sulfate.

In an embodiment of the instant invention, potassium sulfate reject liquor is treated with a starch solution, for example as described in U. S. Patent 2,288,497, and the flocculated slimes are separated from the liquor. The clarified liquor is treated with calcium chloride at a temperature of between about 45° C. and about 60° C. Gypsum precipitates from the mixture in the form of large crystals. Gypsum is separated from the liquor, for example by filtration and the resulting liquor may then be treated with carnallite. Carnallite is obtained in a subsequent step of the process and in operating a continuous process is recycled to this step. Potassium chloride and sodium chloride crystallize from the resulting liquor. After separation of the chloride salts, sufficient water is then removed from the liquor so that upon cooling to a temperature of between about 30° C. and about 70° C., preferably to a temperature between about 60° C. and about 70° C., the cooled liquor is near saturation with respect to bischofite. Solid carnallite and small amounts of sodium chloride and anhydrite are separated from the mixturee, for example, by filtration. The salts are recycled to the carnallite treatment step. The filtrate which contains magnesium chloride can be concentrated at a temperature of between about 170° C. and about 190° C., flaked, and heated in a kiln at a temperature of between about 650° C. and about 700° C. to produce magnesium oxide and hydrochloric acid. The magnesium recovery is about 92.5%.

For a more complete understanding of the instant invention, reference may be had to the figure which is a flow sheet of the instant novel process.

Reject liquor 10 is mixed with starch 11. This flocculates the slimes which are separated from the liquor in primary thickener 12. The underflow 13 from the primary thickener 12 is sent to waste. The clarified liquor, overflow 14, is conducted to a reactor 15 into which a calcium chloride solution 16 is admitted and allowed to react with the liquor 14. The resulting reacted mixture is conducted to a secondary thickener 17 where an overflow 23 is separated from an underflow slurry 18. Underflow slurry 18 is sent to filter 19 to separate the gypsum 21 which is sent to waste. The filtrate 22 from filter 19 is recycled to the secondary thickener 17. The overflow 23 from thickener 17 is conducted to leaching tank 24 to which carnallite cake 36 is added. The resulting mixture is conducted to a thickener 25 which produces two products, an overflow 31 and an underflow slurry 26. The underflow 26 is conducted to filter 27. The resulting filter cake 29, which contains potassium chloride, can be treated to obtain a higher grade potassium chloride concentrate, for example by flotation.

The filtrate 30 from filter 27 is recycled to thickener 25. The overflow 31 from thickener 25 is conducted to evaporator 32 to remove water. The evaporated mixture is conducted to a flash cooler 33 where it is cooled to a point near saturation with respect to bischofite, and the cooled mixture is conducted to filter 34. The resulting filter cake 36 contains principally carnallite and is recycled to leach tank 24. The filtrate 35 which is a purified magnesium chloride solution from filter 34 may, if desired, be sent to boiling kettles, flakers and then to a kiln to produce magnesium chemicals such as magnesium oxide and hydrochloric acid.

In a preferred embodiment of the instant invention, potassium sulfate reject liquor is treated with a calcium chloride solution at a temperature between about 50° C. and about 55° C. In this step, a calcium sulfate salt which is readily filterable is obtained by controlling the temperature at which the mixture is maintained while the crystals are formed. Temperatures above about 60° C. are to be avoided because at this temperature anyhydrite becomes stable and causes a serious decrease in the settling and filtration rates of the crystals.

Generally, the liquor is treated with an aqueous solution containing between about 20% calcium chloride and about an amount of calcium chloride sufficient to saturate the solution. The preferred concentration of this aqueous calcium chloride solution is between about 25% and about 35% by weight. The removal of sulfate upon using a slight excess of aqueous calcium chloride is nearly quantitative, and only traces of sulfate remain in the liquor. The traces of sulfate are separated from the liquor along with the potassium chloride and sodium chloride in a subsequent step of the process.

Separation of the gypsum from the liquor is effected by filtration or by thickening of the mixture followed by filtration in order to obtain an efficient separation of the solid impurities from the liquid. The liquor or filtrate from which gypsum is separated is not saturated with respect to magnesium chloride or carnallite at a temperature between about 50° C. and about 60° C. This liquor must be sufficiently unsaturated with respect to magnesium chloride or carnallite so that it is capable of dissolving substantially all of the magnesium chloride content of the carnallite which is recycled to this step from the subsequent evaporation-flash cooling step. The carnallite contains magnesium chloride and the decomposition of the recycled carnallite must be substantially quantitative to prevent overall losses of magnesium in the process. Recycled carnallite if not dissolved at this step would be separated by filtration with the potassium chloride and sodium chloride. Potassium chloride and sodium chloride are crystallized from the liquor, which has been treated with carnallite. These salts are separated from the liquor by filtration or by thickening followed by filtration. The resulting filter cake contains about 92% of the potassium values contained in the original liquor. The filter cake can be treated in order to recover purified potassium chloride.

Sufficient water is removed from the resulting liquor from which the potassium chloride has been separated so that upon cooling, preferably to between about 60° C. and about 70° C., the liquor is substantially saturated with respect to bischofite. The liquor is evaporated for example, at a temperature at or below atmospheric boiling temperatures or under reduced pressure. However, it is preferably evaporated at a temperature of between about 110° C. and about 120° C. at atmospheric pressure to a magnesium chloride concentration of between about 35% and about 40% and cooled to a temperature between about 60° C. and about 70° C. However, the liquor may be evaporated at any temperature above about 70° C. at atmospheric pressures. During the evaporation steps dissolved potassium chloride combines with magnesium chloride and water and is crystallized as carnallite. This salt, along with sodium chloride and traces of anhydrite formed during the evaporation step, is separated from the magnesium chloride containing solution, for example by filtration, and the filter cake is recycled to the step in which the gypsum mother liquor is treated with carnallite.

If desired, the magnesium chloride containing filtrate may be processed to produce magnesium oxide and hydrochloric acid. In this embodiment of the instant process the magnesium chloride containing filtrate is evaporated to a magnesium concentration of between about 12.5% and about 13.2% by weight at a temperature of between about 170° C. and about 190° C., 12.5% magnesium concentration corresponding to approximately 50% magnesium chloride concentration and 13.2% magnesium concentration corresponding to approximately 53% magnesium chloride concentration. This evaporation step is carried out at a temperature between about 170° C. and about 190° C. because if the evaporator product is to be flaked, the amount of water which is driven off must be carefully controlled. When temperatures below about 170° C. are employed, an insufficient amount of water is removed and the evaporator product will not readily solidify in the subsequent flaking step. When temperatures above about 190° C. are employed, usually too much water is removed and the mixture crystallizes in the evaporator. The evaporated mixture is flaked by pouring the mixture onto a cold surface and flaking the solidified mass from the surface. The flaked magnesium chloride is decomposed by heating at a temperature between about 400° C. and about 700° C. in a kiln, and magnesium oxide and hydrochloric acid are the products. The kiln product contains about 87% magnesium oxide. If desired, talc is added to the magnesium oxide kiln product in order to adjust the silica content of the product for certain commercial purposes. The amount of talc which is mixed with the magnesium oxide is a matter of choice depending upon the type of magnesium oxide-containing product desired.

As a specific example of the instant invention, the following serves as an illustration but it is not intended that the scope of the instant invention be limited thereto.

EXAMPLE

To about 574 pounds of potassium sulfate reject liquor, the analysis of which is set forth in the table following, in a reaction tank having about 14 hours retention time was added a 30% aqueous solution of calcium chloride in the amount of about 142 pounds. The temperature was maintained at between about 50° C. and about 55° C. Gypsum was separated from the resulting mixture by thickening in a conventional type thickener followed by filtration of the underflow from the thickener. The filter cake was washed and the wash water added to the filtrate. The washed filter cake was sent to waste. The analysis of these materials are shown in the following table.

*Composition of materials*

| Material | Pounds | | | | | | |
|---|---|---|---|---|---|---|---|
| | Ca | K | Mg | Na | Cl | SO₄ | H₂O |
| Reject Liquor | | 3.18 | 5.73 | 1.20 | 17.20 | 5.84 | 66.85 |
| Gypsum Cake | 11.00 | 0.72 | 1.54 | 0.29 | 6.78 | 25.39 | 54.37 |
| Thickener Underflow | 6.55 | 2.01 | 3.38 | 0.74 | 13.30 | 14.86 | 59.16 |
| Filtrate | 0.20 | 2.82 | 5.07 | 1.07 | 19.20 | 0.25 | 71.39 |

Carnallite (formed in the subsequent evaporation-flash-cooling step) was leached at a temperature of between about 50° C. and about 55° C. with the filtrate from the gypsum filtration step. The leached solids which were separated from the liquor analyzed approximately 69.1% potassium chloride, 35.8% sodium chloride, and 2.3% calcium sulfate. Water was evaporated from the liquor until the magnesium chloride concentration of the liquor was between about 35% and about 40% by weight at about a temperature of 118° C. The concentrated liquor was flash-cooled to a temperature between about 60° C. and about 65° C. at which point it was substantially saturated with respect to bischofite. The carnallite and small amounts of sodium chloride which crystallized during this operation were separated from the concentrated liquor by filtration and were recycled to the carnallite leaching step. The concentrated liquor had an analysis approximately as follows: magnesium 9.5%, chlorine 28.5%, water 61.3%, sulfate 0.07%, sodium 0.2%, potassium 0.2% and calcium 0.2%.

Having thus fully described and illustrated the character of the instant invention, what is desired to be secured and claimed by Letters Patent is:

1. A process for producing a sulfate-free and potassium-free magnesium chloride solution from an aqueous liquor containing sulfates and chlorides of magnesium and potassium, which comprises reacting with said liquor calcium chloride in an amount sufficient to convert the sulfate present in said liquor to gypsum, said reaction being conducted at a temperature between about 45° C. and about 60° C. to produce said gypsum in a readily filterable form, substantially completely removing sulfate from said reaction mixture by separating said gypsum therefrom, and concentrating the substantially sulfate-free solution from which said gypsum is separated to substantially completely precipitate the potassium present as a carnallite containing solid material and produce as the mother liquor from which said solid material is precipitated, a substantially sulfate- and potassium-free magnesium chloride solution.

2. A process for the treatment of liquors which comprises reacting at a temperature between about 45° C. and about 60° C. a potassium sulfate reject liquor obtained by the separation of potassium sulfate crystals from an aqueous reacted mixture originally comprising essentially water, langbeinite, and potassium chloride with calcium chloride in sufficient amount to convert substantially all of the sulfate initially present in the liquor to gypsum, separating the gypsum from the resulting mixture, adding carnallite to the mixture from which the gypsum has been separated, separating solid potassium chloride containing material from the carnallite-treated mixture, evaporating the solution from which the solid material has been separated to a magnesium chloride concentration of between about 35% and about 40%, cooling the evaporated mixture to a temperature between about 30° C. and about 70° C., and separating solid carnallite containing material from the magnesium chloride containing solution.

3. A process for the treatment of liquors which comprises reacting at a temperature between about 45° C. and about 60° C. a liquor containing sulfates and chlorides of magnesium and potassium, with a solution containing calcium chloride in sufficient amount to convert substantially all of the sulfate initially present in the liquor to gypsum, separating the gypsum from the resulting mixture, adding carnallite from a later step in the process to the said mixture, separating solid potassium chloride-containing material from the carnallite-treated mixture, evaporating water from the solution from which the solid material has been separated at a temperature between about 70° C. and about 120° C., cooling the evaporated mixture to a temperature between about 30° C. and about 70° C., separating solid carnallite-containing material from the magnesium chloride containing solution and recycling said carnallite material.

4. A process for the treatment of potassium sulfate reject liquors obtained by the separation of potassium sulfate crystals from an aqueous reacted mixture originally comprising essentially water, langbeinite, and potassium chloride which comprises reacting said liquor at a temperature between about 45° C. and about 60° C. and a solution containing calcium chloride in sufficient amount to convert substantially all of the sulfate initially present in the liquor to gypsum, separating the gypsum from the mixture, adding carnallite to the resulting solution, separating solid material from the carnallite-treated mixture, evaporating water from the solution from which the solid material has been separated at about atmospheric boiling temperature to a magnesium chloride concentration of between about 35% and about 40%, cooling the resulting mixture to a temperature of between about 60° C. and about 70° C., separating solid carnallite-containing material from the magnesium chloride containing mixture, and recycling said carnallite material to the carnallite treatment step, heating said magnesium chloride containing mixture at a temperature between about 170° C. and about 190° C. to a magnesium chloride concentration of between about 50% and about 53% by weight, flaking the resulting magnesium chloride mixture, heating the flaked magnesium chloride at a temperature between about 400° C. and about 700° C. to produce hydrochloric acid and magnesium oxide, and adding talc to the magnesium oxide.

5. A process for the treatment of liquors which comprises reacting at a temperature between about 45° C. and about 60° C., a potassium sulfate reject liquor and a calcium chloride solution containing between about 20% and about 35% of calcium chloride and in sufficient amount to convert substantially all of the sulfate initially present in the liquor to gypsum, separating the gypsum from the mixture, adding carnallite to the mixture from which the gypsum has been separated, separating solid material from the carnallite-treated mixture, evaporating the resulting solution to a magnesium chloride concentration of between about 35% and about 40% by weight, cooling the mixture and separating solid carnallite-containing material therefrom.

6. A process for the treatment of liquors which comprises reacting at a temperature between about 45° C. and about 60° C., a potassium sulfate reject liquor obtained by the separation of potassium sulfate crystals from an aqueous reacted mixture originally comprising essentially water, langbeinite, and potassium chloride with a calcium chloride solution containing between about 25% and about 35% of calcium chloride in sufficient amount to convert substantially all of the sulfate initially present in the liquor to gypsum, separating the gypsum from the mixture, adding carnallite to the resulting mixture, separating solid material from the carnallite-treated mixture, evaporating water from the resulting solution to a magnesium chloride concentration of between about 35% and about 40% at a temperature of between about 70° C. and about 120° C., cooling the evaporated mixture to a temperature of between about 30° C. and about 70° C., separating solid carnallite-containing material from the magnesium chloride containing solution and recycling said carnallite material.

References Cited in the file of this patent

UNITED STATES PATENTS 2,394,570    Sturbelle _____ Feb. 12, 1946

OTHER REFERENCES

J. W. Mellor's "A Comprehensive Treatise on Inorganic and Theoretical Chemistry," vol. 2, pp. 432–433. Longmans, Green & Co., New York.

"Handbook of Chemistry and Physics," 27th Ed., pp. 362–363, by C. D. Hodgman. Chemical Rubber Publishing Co., Cleveland.

"Hachk's Chemical Dictionary," page 129, 1944 ed. The Blakiston Co., Philadelphia.

"Journal Indian Chem. Soc.," Ind. & News Ed., vol. 14, Nos. 3 and 4, 1951, page 171.